United States Patent
Wu et al.

(10) Patent No.: US 9,668,280 B2
(45) Date of Patent: May 30, 2017

(54) METHOD OF HANDLING RANDOM ACCESS IN WIRELESS COMMUNICATION SYSTEM

(71) Applicant: HTC Corporation, Taoyuan County (TW)

(72) Inventors: Chih-Hsiang Wu, Taoyuan County (TW); Chih-Yao Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 127 days.

(21) Appl. No.: 14/529,159

(22) Filed: Oct. 31, 2014

(65) Prior Publication Data

US 2015/0124746 A1 May 7, 2015

Related U.S. Application Data

(60) Provisional application No. 61/898,492, filed on Nov. 1, 2013.

(51) Int. Cl.
*H04W 4/00* (2009.01)
*H04W 74/00* (2009.01)
*H04W 74/08* (2009.01)
*H04W 72/12* (2009.01)

(52) U.S. Cl.
CPC ..... *H04W 74/008* (2013.01); *H04W 74/0833* (2013.01); *H04W 72/1289* (2013.01)

(58) Field of Classification Search
CPC .......... H04W 74/008; H04W 74/0833; H04W 72/1289
See application file for complete search history.

(56) References Cited

U.S. PATENT DOCUMENTS

| 8,170,570 | B2 * | 5/2012 | Park | H04W 74/0866 |
| | | | | 455/450 |
| 9,215,678 | B2 * | 12/2015 | Dinan | H04W 56/0045 |
| 2010/0331003 | A1 * | 12/2010 | Park | H04W 74/0866 |
| | | | | 455/450 |
| 2013/0250888 | A1 | 9/2013 | Lu | |
| 2015/0117374 | A1 * | 4/2015 | Wu | H04W 74/0833 |
| | | | | 370/329 |

FOREIGN PATENT DOCUMENTS

WO 2015005701 A1 1/2015

OTHER PUBLICATIONS

European Search report issued on Feb. 16, 2015 for EP application No. 14191258.4.

(Continued)

*Primary Examiner* — Phuc Tran
(74) *Attorney, Agent, or Firm* — Winston Hsu; Scott Margo

(57) ABSTRACT

A method of handling random access for a user equipment of a wireless communication system includes transmitting a plurality of repetitions of a random access preamble in a repetition window; and monitoring a physical downlink control channel for at least one random access response identified by a random access radio network temporary identifier (RA-RNTI); wherein the RA-RNTI is determined based on a specific subframe within the repetition window.

22 Claims, 9 Drawing Sheets

(56) References Cited

OTHER PUBLICATIONS

NTT DOCOMO, "Discussion on Multi-level PRACH Coverage Enhancement", 3GPP TSG RAN WG1 Meeting#74bis, R1-134493, Oct. 7-11, 2013, Guangzhou, China, XP050717595, pp. 1-5.
3GPP TR 36.888 V12.0.0 (Jun. 2013), "3rd Generation Partnership Project; Technical Specification Group Radio Access Network; Study on provision of low-cost Machine-Type Communications (MTC) User Equipments (UEs) based on LTE (Release 12)", pp. 1-55.
3GPP TS 36.300 V11.7.0 (Sep. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", pp. 1-209.
3GPP TS 36.331 V11.5.0 (Sep. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-347.
3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", pp. 1-57.

\* cited by examiner

METHOD OF HANDLING RANDOM ACCESS IN WIRELESS COMMUNICATION SYSTEM

CROSS REFERENCE TO RELATED APPLICATIONS

This application claims the benefit of U.S. Provisional Application No. 61/898,492, filed on Nov. 1, 2013 and titled "Method and Apparatus for random access in enhanced coverage mode in a wireless communication system", the contents of which are incorporated herein by reference.

BACKGROUND OF THE INVENTION

1. Field of the Invention

The present invention relates to a method utilized in a wireless communication system, and more particularly, to a method of handling random access for a user equipment with coverage enhancement in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a Node-B (NB) or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resources required by the wireless link is needed to be allocated (i.e., assigned). Reuse of existing infrastructures and wireless communication systems becomes a viable choice for operations of the MTC device. Therefore, the UMTS, the LTE system and the LTE-A system, etc., developed by the 3GPP which are widely deployed are suitable for the operations of the MTC device.

Some MTC devices may be installed in the basements of residential buildings or locations shielded by foil-backed insulation, metalized windows or traditional thick-walled building construction, and these devices would experience more significant penetration losses on the radio interface than normal LTE devices. The MTC devices in the extreme coverage scenario might have characteristics such as very low data rate, greater delay tolerance and no mobility, and therefore some messages/channels may not be required.

More energy can be accumulated to improve coverage by prolonging transmission time. The existing transmission time interval (TTI) bundling and hybrid automatic repeat request (HARQ) retransmission in data channel can be helpful. Note that since the current maximum number of UL HARQ retransmissions is 28 and TTI bundling is up to 4 consecutive subframes, TTI bundling with a larger TTI bundle size may be considered and the maximum number of HARQ retransmissions may be extended to achieve better performances. Other than the TTI bundling and HARQ retransmission, repetition can be applied by repeating the same or different redundancy versions (RV) multiple times. In addition, code spreading in the time domain can also be considered to improve coverage. MTC traffic packets could be radio link control (RLC) transmission segmented into smaller packets; very low rate coding, lower modulation order (e.g., BPSK) and shorter length cyclic redundancy check (CRC) may also be used. New decoding techniques (e.g., correlation or reduced search space decoding) can be used to improve coverage by taking into account the characteristics of the particular channels (e.g., channel periodicity, rate of parameter changes, channel structure, limited content, etc.) and the relaxed performance requirements (e.g., delay tolerance).

When a UE initiates a random access procedure to get uplink synchronization with an eNB, the UE transmits a random access preamble. Once the random access preamble is transmitted, the UE shall monitor the physical downlink control channel (PDCCH) for random access response(s) identified by the random access radio network temporary identifier (RA-RNTI) defined below, in the random access response window which starts at the subframe that contains the end of the preamble transmission plus 3 subframes and has a length equal to ra-ResponseWindowSize (i.e. 10) subframes. The RA-RNTI associated with the physical random access channel (PRACH) in which the random access preamble is transmitted is computed as:

$$\text{RA-RNTI} = 1 + t\_id + 10 \times f\_id;$$

where t_id is the index of the first subframe of the specified PRACH ($0 \leq t\_id < 10$), and f_id is the index of the specified PRACH within that subframe, in ascending order of frequency domain ($0 \leq f\_id < 6$). The UE may stop monitoring for random access response(s) after successful reception of a random access response containing random access preamble identifiers that match the transmitted random access preamble.

When a UE initiates a random access procedure in the enhanced coverage mode, the UE transmits repetitions of a random access preamble to an eNB. However, it is not clear how to determine the RA-RNTI and transmit the random access response(s) accordingly when repetitions of the random access preamble are incorporated in the random access procedure. Thus, there is a need for improvement over the prior art.

SUMMARY OF THE INVENTION

It is therefore an objective of the present invention to provide a method of handling random access with coverage enhancement in a wireless communication system to solve the abovementioned problem.

The present invention discloses a method of handling random access for a user equipment (UE) of a wireless communication system. The method comprises transmitting a plurality of repetitions of a random access preamble in a repetition window; and monitoring a physical downlink control channel (PDCCH) for at least one random access response identified by a random access radio network temporary identifier (RA-RNTI); wherein the RA-RNTI is determined based on a specific subframe within the repetition window.

The present invention further discloses a method of handling random access for a UE of a wireless communication system. The method comprises transmitting a plurality of repetitions of a random access preamble in a repetition window; and monitoring a PDCCH for at least one random access response identified by a RA-RNTI; wherein each of the plurality of repetitions in a specific subframe of at least one radio frame within the repetition window has a same order of a frequency domain location.

The present invention further discloses a method of handling random access for a UE of a wireless communication system. The method comprises performing a first random access procedure by transmitting a plurality of repetitions of a first random access preamble when the UE fails to perform a second random access procedure without repetitions of a second random access preamble.

The present invention further discloses a method of handling random access for a network of a wireless communication system. The method comprises receiving a plurality of repetitions of a random access preamble transmitted in a repetition window of a UE of the wireless communication system; and determining a RA-RNTI based on a specific subframe within the repetition window; and transmitting at least one random access response identified by the RA-RNTI to allow the UE to monitor a PDCCH for the at least one random access response.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
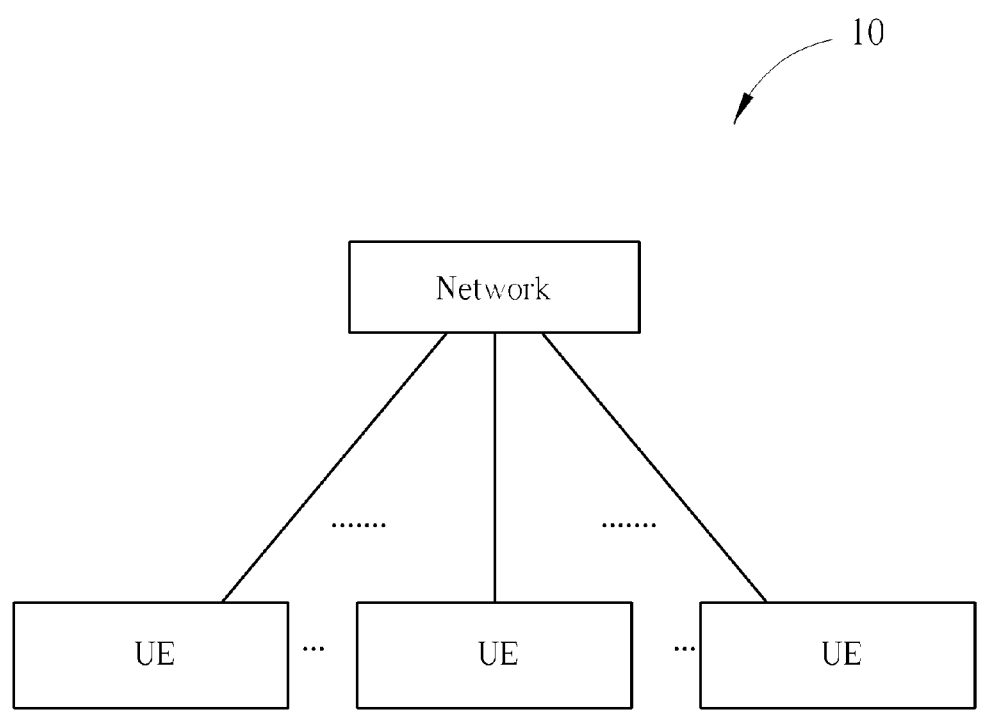
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network. A UE can be a machine type communication (MTC) device, a mobile phone, a laptop, a tablet computer, an electronic book or a portable computer system but is not limited. In addition, the network and the UE can be seen as a transmitter or a receiver according to direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
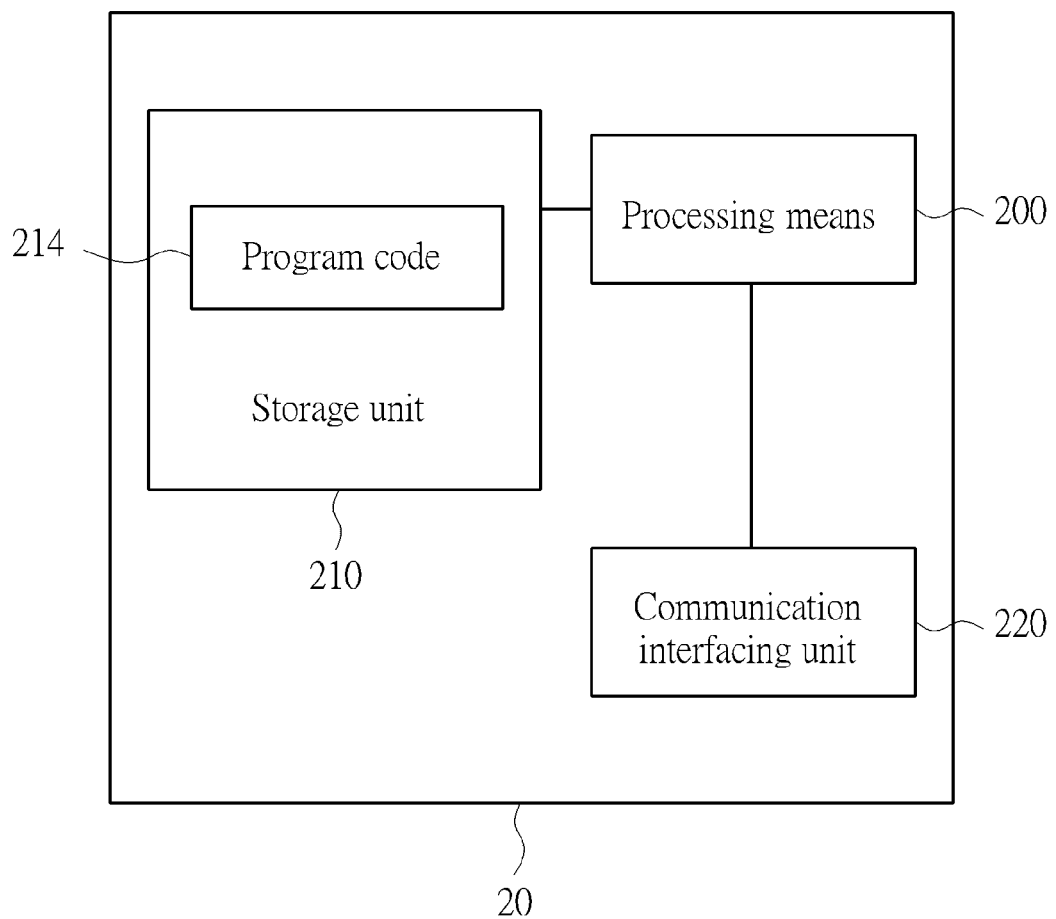
FIG. 2 is a schematic diagram of a communication device according to an embodiment of the present invention.

Please refer to FIG. 2, which is a schematic diagram of a communication device 20 according to an embodiment of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
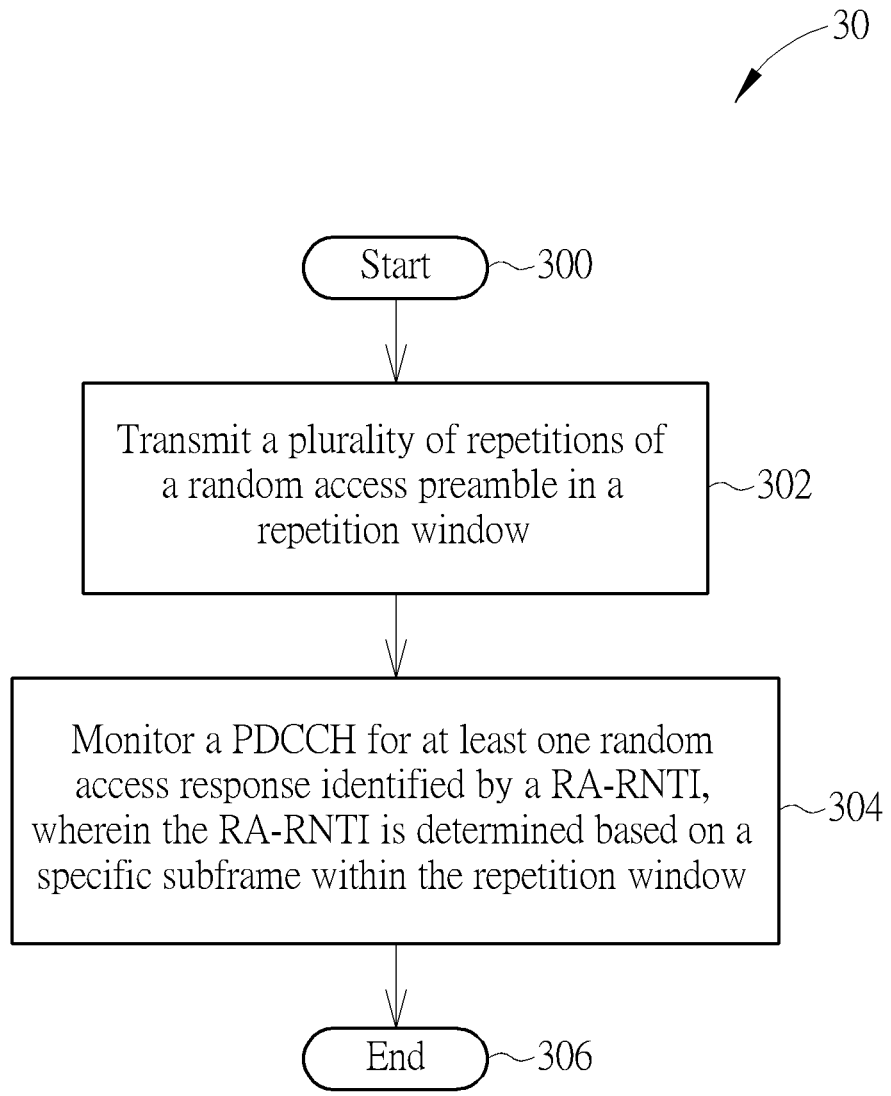
FIG. 3 is a flowchart of a process according to an embodiment of the present invention.

Please refer to FIG. 3, which is a flowchart of a process 30 according to an embodiment of the present invention. The process 30 may be utilized in a UE of the wireless communication system 10 shown in FIG. 1, for handling random access with coverage enhancement. The process 30 may be compiled into the program code 214 and includes the following steps:

Step 300: Start.

Step 302: Transmit a plurality of repetitions of a random access preamble in a repetition window.

Step 304: Monitor a physical downlink control channel (PDCCH) for at least one random access response identified by a random access radio network temporary identifier (RA-RNTI), wherein the RA-RNTI is determined based on a specific subframe within the repetition window.

Step 306: End.

According to the process 30, the UE in an enhanced coverage mode first transmits a plurality of repetitions of a random access preamble in a repetition window, in order to initiate a random access procedure to get uplink synchronization with an eNB. The UE then monitors the PDCCH for random access response(s) identified by a RA-RNTI. The RA-RNTI is determined based on a specific subframe within the repetition window.

Figure 4:
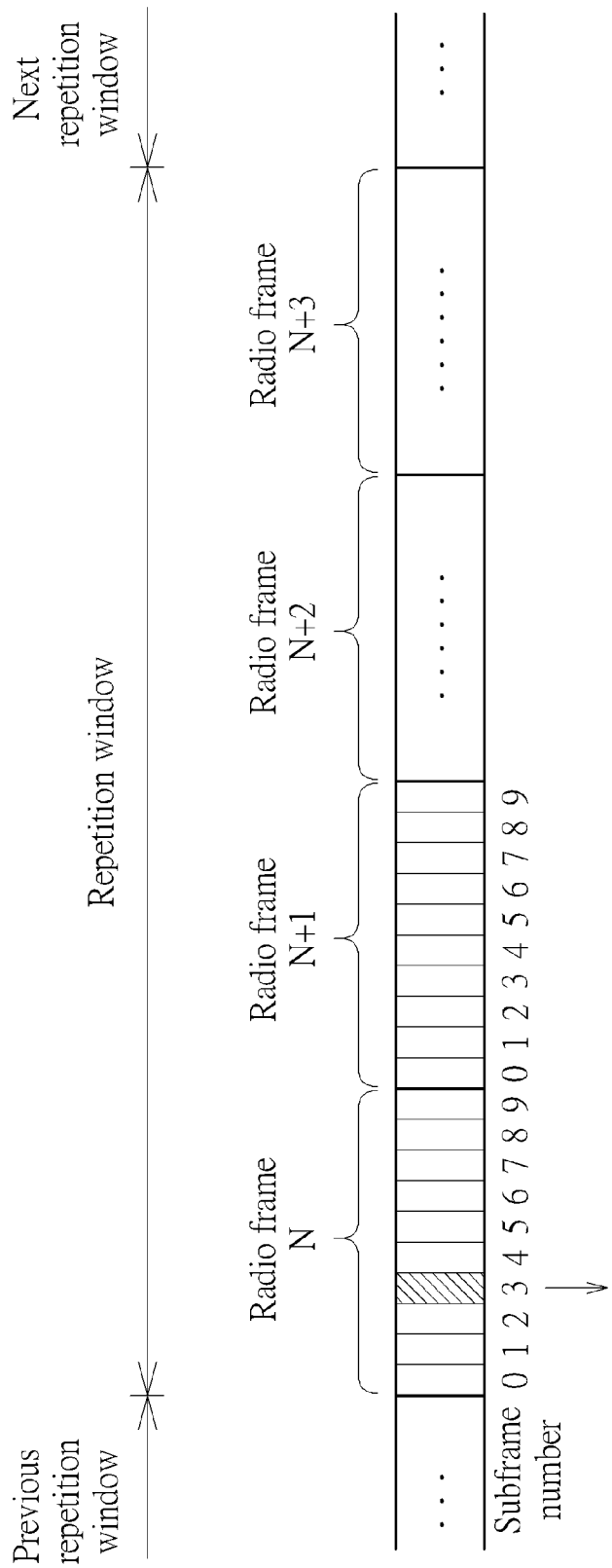
FIG. 4 is a schematic diagram of determination of the RA-RNTI based on the specific subframe.

Different from the prior art where the RA-RNTI is determined based on the first subframe of a physical random access channel (PRACH) transmitting a preamble without repetitions, the embodiment of the present invention utilizes the repetition window to determine the RA-RNTI since multiple repetitions of the random access preamble are transmitted in the repetition window for coverage enhancement. More specifically, the RA-RNTI may be determined based on any subframe within the repetition window. For example, please refer to FIG. 4, which is a schematic diagram of determination of the RA-RNTI based on the specific subframe. As shown in FIG. 4, the repetition window includes radio frames N, N+1, N+2 and N+3, each of which includes 10 subframes assigned with numbers 0-9. The specific subframe may be determined to be any subframe in the repetition window. For example, the specific subframe may be the subframe 3 of the radio frame N since the subframe 3 of the radio frame N is the first subframe for the UE to transmit a repetition of the random access preamble. Note that in another example, the specific subframe may be determined to be the first subframe of the repetition window; this is not limited herein. In addition, the repetition window spreads across four radio frames as shown in FIG. 4, but in another embodiment, the repetition window may be within a radio frame; this is determined according to how many repetitions the random access preamble has and/or how the UE transmits these repetitions.

In an embodiment, the RA-RNTI is computed as:

$$RA\text{-}RNTI=1+t\_id+10\times f\_id;$$

wherein t_id is an index of the specific subframe in a radio frame within the repetition window (e.g., t_id is 3 as shown in FIG. 4), and f_id is an index of a specific physical resource block (PRB) pair for transmitting one of the plurality of repetitions of the random access preamble within a PRACH within the specific subframe in an ascending order of the frequency domain.

Please note that the t_id in this embodiment is the index of the specific subframe selected for determination of RA-RNTI in the repetition window, and is different from the t_id in the prior art which is the index of the first subframe of the specified PRACH. The t_id ranges from 0 to 9 since each radio frame includes 10 subframes. In addition, the f_id in this embodiment is the index of the PRB pair for the UE to transmit a repetition of the random access preamble within the PRACH within the selected subframe, wherein the f_id is arranged in an ascending order of the frequency domain and ranges from 0 to 5. More specifically, the number of PRACHs in maximum within each subframe may be 6; hence, the maximum of 6 indices (e.g. 0-5) are applied to stagger the specific PRB pairs for PRACHs in the frequency domain. The UE may transmit a repetition of the random access preamble in other pairs, but the maximum number of specific PRB pairs for PRACHs is 6 PRB pairs. If only one repetition of the random access preamble for the UE is transmitted within the specific subframe, the index of the PRB pair transmitting this repetition is applied for the UE. If there are more than two repetitions of the random access preamble for the UE transmitted within the specific subframe, one of the PRB pairs transmitting one of these repetitions may be considered for the determination of f_id.

Figure 5:
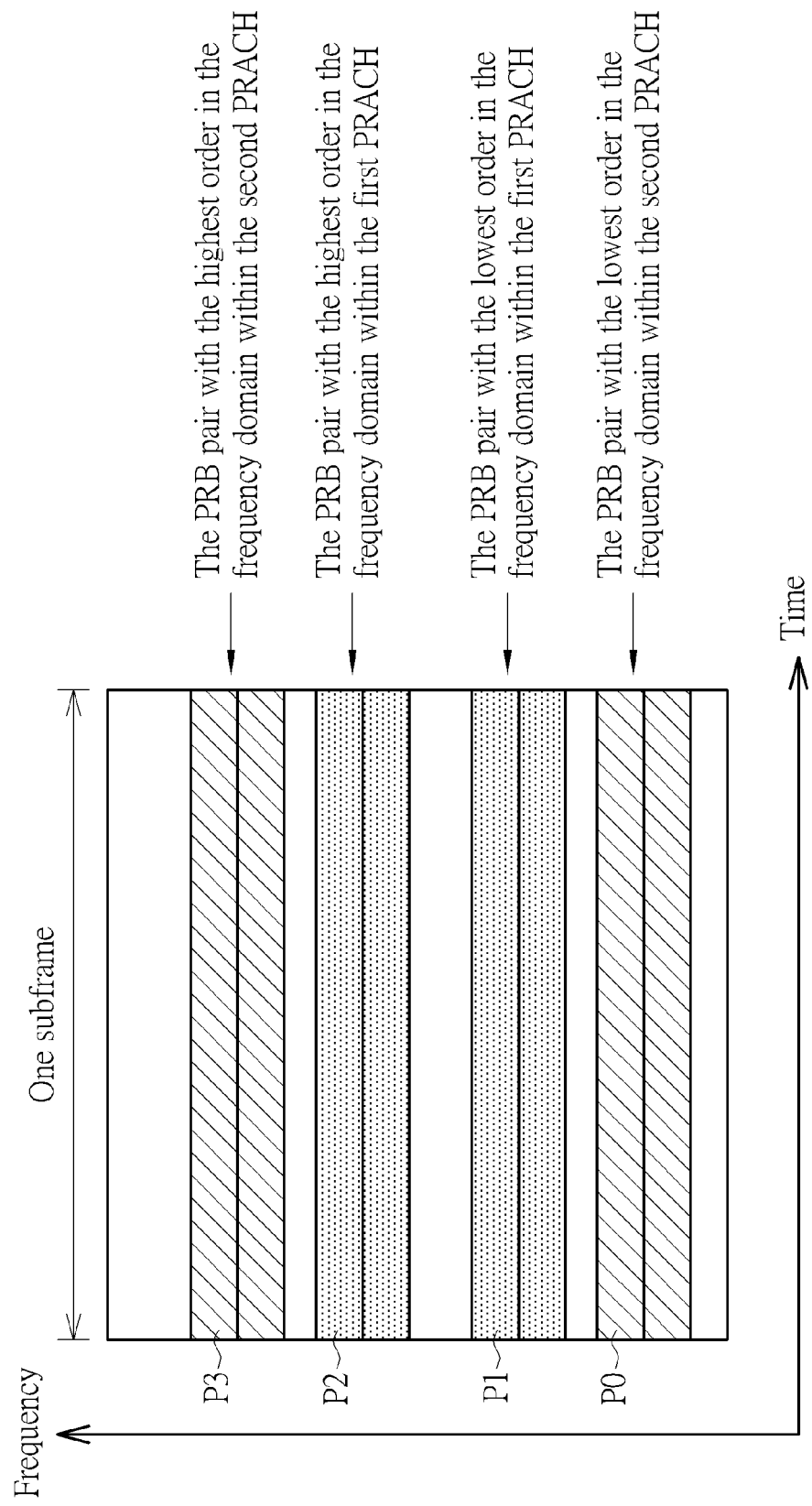
FIG. 5 is a schematic diagram of an allocation of PRACHs in PRB pairs within a subframe according to an embodiment of the present invention.

Please refer to FIG. 5, which is a schematic diagram of an allocation of PRACHs in PRB pairs within a subframe according to an embodiment of the present invention. As shown in FIG. 5, there are PRB pairs P0-P3 within this specific subframe and the PRB pairs P0-P3 are allocated in an ascending order of P0, P1, P2 and P3 in the frequency domain. A UE transmits two repetitions of a random access preamble within a first PRACH by using the PRB pairs P1 and P2 in this subframe. Another UE also transmits two repetitions of a random access preamble within a second PRACH by using the PRB pairs P0 and P3 in this subframe.

Please note that the index of the PRB pair is determined based on comparison with other PRB pairs of all PRACHs within the specific subframe in the ascending order of the frequency domain. In an embodiment, a PRB pair with the lowest order in the frequency domain among the PRB pairs transmitting the repetitions of the random access preamble within the PRACH for a UE within the specific subframe may be applied for the determination of f_id for the UE. For example, among the PRB pairs P1 and P2 utilized for transmitting the random access preamble within the first PRACH, the PRB pair P1 may be selected for the determination of f_id since the PRB pair P1 has the lowest frequency among the PRB pairs P1 and P2. Similarly, among the PRB pairs P0 and P3 utilized for transmitting the random access preamble within the second PRACH, the PRB pair P0 may be selected for the determination of f_id since the PRB pair P0 has the lowest frequency among the PRB pairs P0 and P3. In such a condition, the index f_id should be determined according to comparison between the frequencies of the PRB pairs P0 and P1 and configured in an ascending order of the frequency domain. That is, the index f_id for the RA-RNTI associated with the second PRACH may be 0 and the index f_id for the RA-RNTI associated with the first PRACH may be 1, since the PRB pair P0 within the second PRACH has a lower order than the PRB pair P1 within the first PRACH with the ascending order of frequency.

Alternatively, in another embodiment, the determination of f_id may also be performed by using a PRB pair with the highest order in the frequency domain among the PRB pairs transmitting the repetitions of the random access preamble within the PRACH for a UE within the specific subframe. For example, among the PRB pairs P1 and P2 utilized for transmitting the random access preamble within the first PRACH, the PRB pair P2 may be selected for the determination of f_id since the PRB pair P2 has the highest frequency among the PRB pairs P1 and P2. Similarly, among the PRB pairs P0 and P3 utilized for transmitting the random access preamble within the second PRACH, the PRB pair P3 may be selected for the determination of f_id since the PRB pair P0 has the highest frequency among the PRB pairs P0 and P3. In such a condition, the index f_id should be determined according to comparison between the frequencies of the PRB pairs P2 and P3 and configured in an ascending order of the frequency domain. That is, the index f_id for the RA-RNTI associated with the first PRACH may be 0 and the index f_id for the RA-RNTI associated with the second PRACH may be 1, since the PRB pair P2 within the first PRACH has a lower order than the PRB pair P3 within the second PRACH with the ascending order of frequency.

Figure 6:
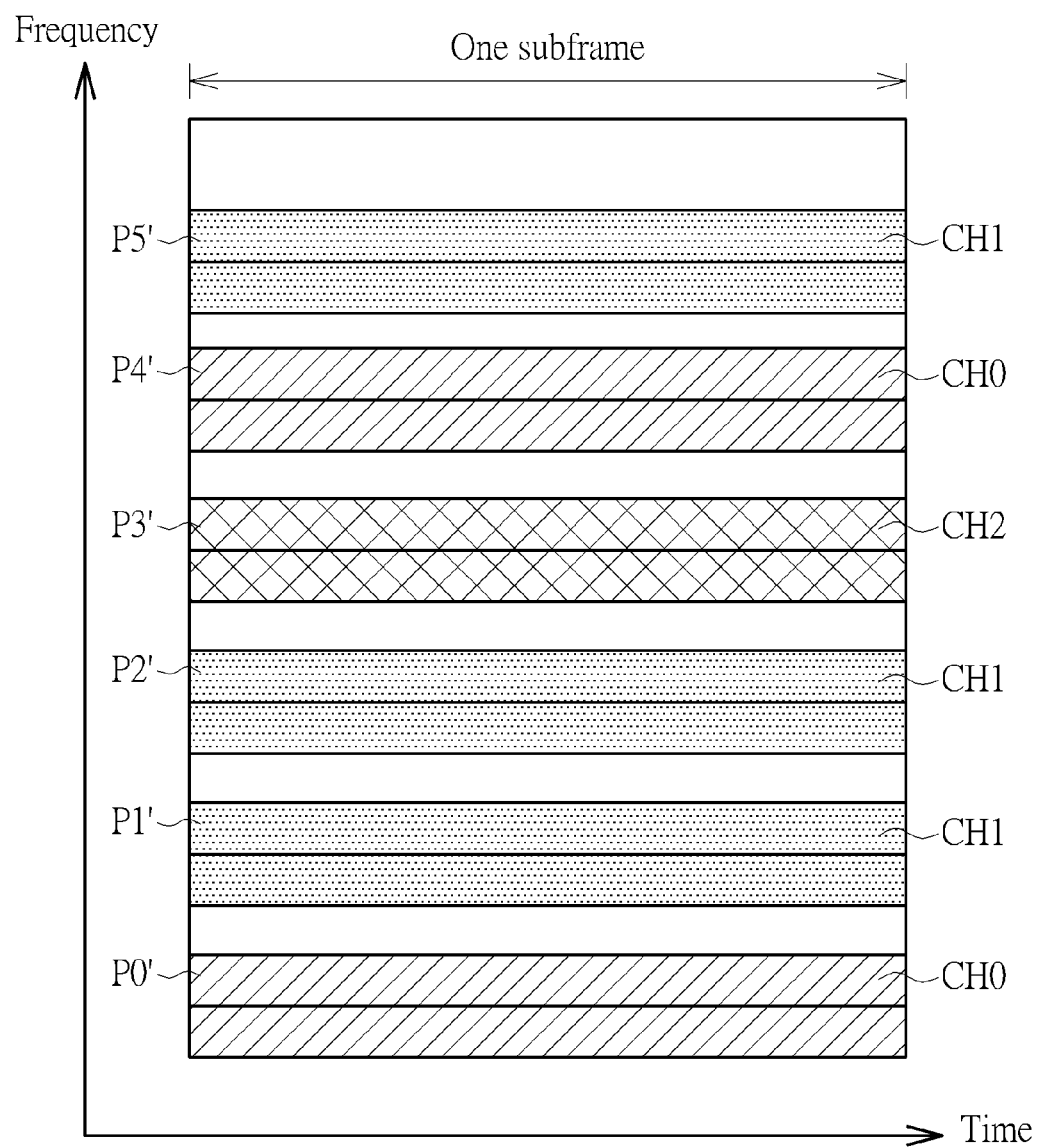
FIG. 6 is a schematic diagram of an allocation of PRACHs in PRB pairs within another subframe according to an embodiment of the present invention.

There may be more PRACHs using the PRB pairs within a subframe. For example, please refer to FIG. 6, which is a schematic diagram of an allocation of PRACHs in PRB pairs within another subframe according to an embodiment of the present invention. As shown in FIG. 6, the PRB pairs P0'-P5' within this subframe are allocated in an ascending order of P0', P1', P2', P3', P4', and P5' in the frequency domain, which transmit the random access preambles in the PRACHs CH0, CH1, CH1, CH2, CH0 and CH1, respectively. For the PRACH CH0, one of the PRB pair P0' and P4' may be selected to perform determination of the index f_id for the RA-RNTI. For the PRACH CH1, one of the PRB pair P1', P2' and P5' may be selected to perform determination of the index f_id for the RA-RNTI. For the PRACH CH2, the PRB pair P3' may be utilized to perform determination of the index f_id for the RA-RNTI. The index f_id may be determined according to comparison between the selected PRB pairs. For example, if the PRB pair with the lowest order in the frequency domain among the PRB pairs transmitting the repetitions of the random access preamble within a specific PRACH is selected, the PRB pair P0' may be selected for the PRACH CH0, and the PRB pair P1' may be selected for the PRACH CH1. In such a condition, the index f_id should be determined according to comparison between the frequencies of the PRB pairs P0', P1' and P3' for the PRACHs CH0-CH2 and configured in an ascending order of the frequency domain. That is, the indices f_id for the RA-RNTIs associated with the PRACHs CH0, CH1 and CH2 are 0, 1 and 2, respectively, according to the comparison result of the PRB pairs P0', P1' and P3' with the ascending order of frequency.

In an embodiment, the RA-RNTIs associated with the PRACHs in which repetitions of a random access preamble is transmitted may be distinguished from those associated with other PRACHs without transmissions of repetitions. In other words, the eNB may differentiate a UE in the enhanced coverage mode (i.e. the UE which transmits repetitions of a random access preamble) from a UE in the normal mode without coverage enhancement (i.e. the UE which transmits a random access preamble without repetitions) by using the RA-RNTI. In such a condition, the RA-RNTI may be computed as follows:

$$RA\text{-}RNTI = 1 + t\_id + 10 \times f\_id + delta\_shift;$$

wherein t_id and f_id have definitions the same as in the above embodiments, and delta_shift is a shift parameter to prevent overlap of a RA-RNTI for a PRACH in which repetitions of a random access preamble are transmitted with a RA-RNTI for a PRACH in which a legacy random access preamble without repetitions is transmitted. In other words, via the parameter delta_shift, the RA-RNTI for the PRACH in which repetitions of the random access preamble are transmitted will not be collided with the RA-RNTI for the PRACH in which the random access preamble without repetitions is transmitted. For example, the delta_shift may be a maximum RA-RNTI used by a UE which transmits a random access preamble without repetitions. That is, if the maximum allowable t_id is 9 and f_id is 5, the delta_shift may be equal to 1+9+10×5=60. In other words, the RA-RNTIs 0-60 are used for a PRACH without transmissions of repetitions of a random access preamble, and the RA-RNTIs for a PRACH in which repetitions of a random access preamble are transmitted may start from 61.

Please note that the delta_shift may be determined by other methods. For example, in a frequency division duplex (FDD) system, the parameter f_id may be fixed to 0 because there is only one PRACH source transmitted in each subframe in the FDD system. In such a condition, the delta_shift may be configured to 1, and this allows the eNB to differentiate a UE in the enhanced coverage mode and a UE without coverage enhancement to some extent.

Figure 7:
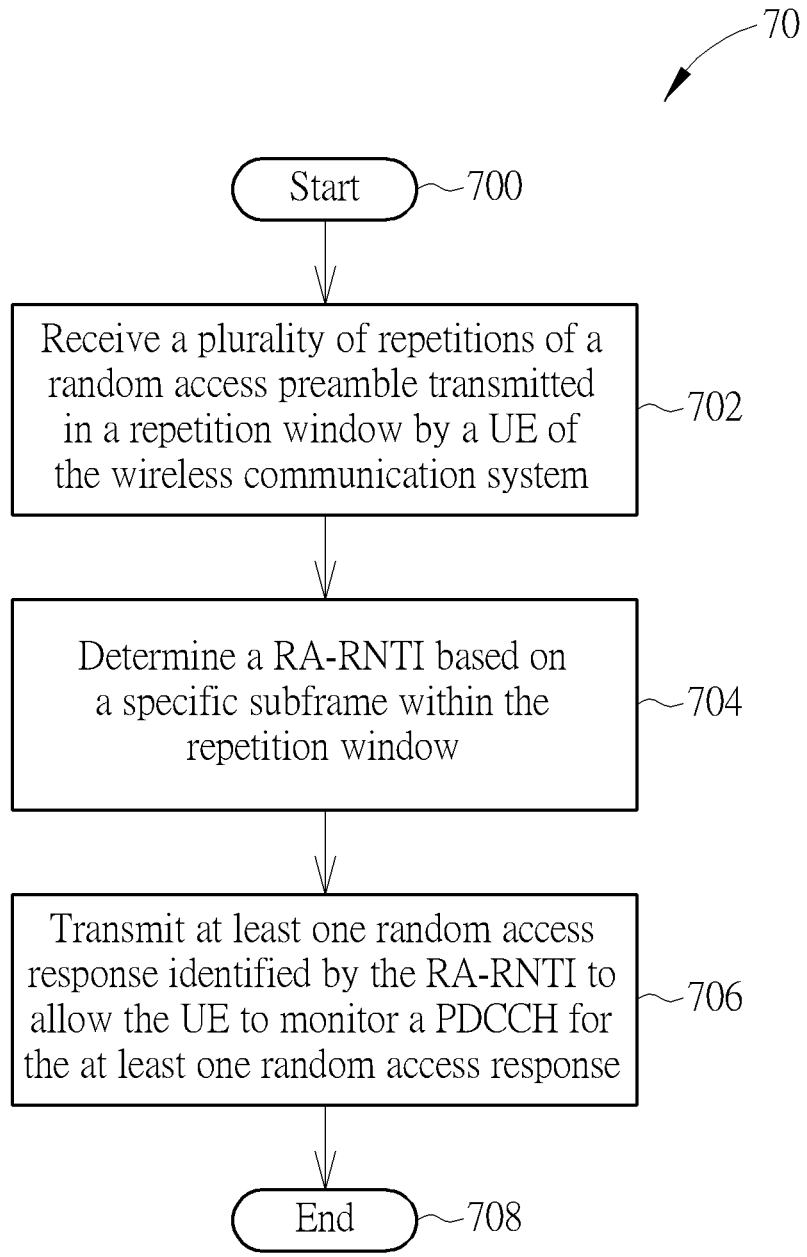
FIGS. 7-9 are flowcharts of a process according to embodiments of the present invention.

Please refer to FIG. 7, which is a flowchart of a process 70 according to an embodiment of the present invention. The process 70 may be utilized in an eNB in the network of the wireless communication system 10 shown in FIG. 1, for handling random access with coverage enhancement. The process 70 may be compiled into the program code 214 and includes the following steps:

Step 700: Start.

Step 702: Receive a plurality of repetitions of a random access preamble transmitted in a repetition window by a UE of the wireless communication system 10.

Step 704: Determine a RA-RNTI based on a specific subframe within the repetition window.

Step 706: Transmit at least one random access response identified by the RA-RNTI to allow the UE to monitor a PDCCH for the at least one random access response.

Step 708: End.

According to the process 70, the eNB first receives a plurality of repetitions of a random access preamble transmitted in a repetition window by a UE of the wireless communication system 10 when the UE initiates a random access procedure to get uplink synchronization with the eNB. The eNB then determines a RA-RNTI for the random access preamble based on a specific subframe within the repetition window, and transmits random access response(s) identified by the RA-RNTI on the PDCCH when the eNB successfully decodes the random access preamble. The UE then monitors the PDCCH for the random access response(s) identified by the RA-RNTI.

Please note that the process 70 includes the behavior of an eNB in response to a UE performing the process 30. Based on the above descriptions, those skilled in the art should be able to apply the above embodiments and related variations for the process 30 to the behavior of eNB as the variations and alternations of the process 70; this will not be narrated herein.

After the RA-RNTI for a random access preamble is determined, the eNB may transmit downlink control information (DCI) scrambled by the RA-RNTI on the PDCCH when the eNB successfully decodes the random access preamble. In addition, the eNB may transmit to the UE a configuration for the repetition window, which indicates a start position and a length of the repetition window via broadcast (e.g., system information) or a dedicated signaling (e.g., the RRCConnectionReconfiguration message or handover command). In other words, the eNB may predefine the start position and the length of the repetition window for the UE according to signal strength of the UE when the eNB determines that the UE is in the enhanced coverage mode. For example, the eNB may determine that the repetition window may start at the subframe 3 of the system frame No. 50, and that the length of the repetition window may be equal to 10 radio frames. If there are more repetitions of the random access preamble transmitted by the UE, the corresponding repetition window may be longer.

Furthermore, in an embodiment, the UE may monitor the PDCCH for random access response(s) identified by the RA-RNTI in a random access response window, which may be determined according to the characteristics of the repetition window. In other words, the position and length of the random access response window in which the UE expects to receive the random access response (s) may be determined according to the repetition window. For example, the random access response window may start at the first subframe that contains the end of a repetition among the plurality of repetitions of the random access preamble within the repetition window plus three subframes, and have a length equal to the repetition window plus ra-ResponseWindow-Size subframes. In such a condition, the random access response window may be long enough to cover receptions of any possible random access response(s) in response to any repetitions in the repetition window successfully received and decoded by the eNB.

Figure 8:
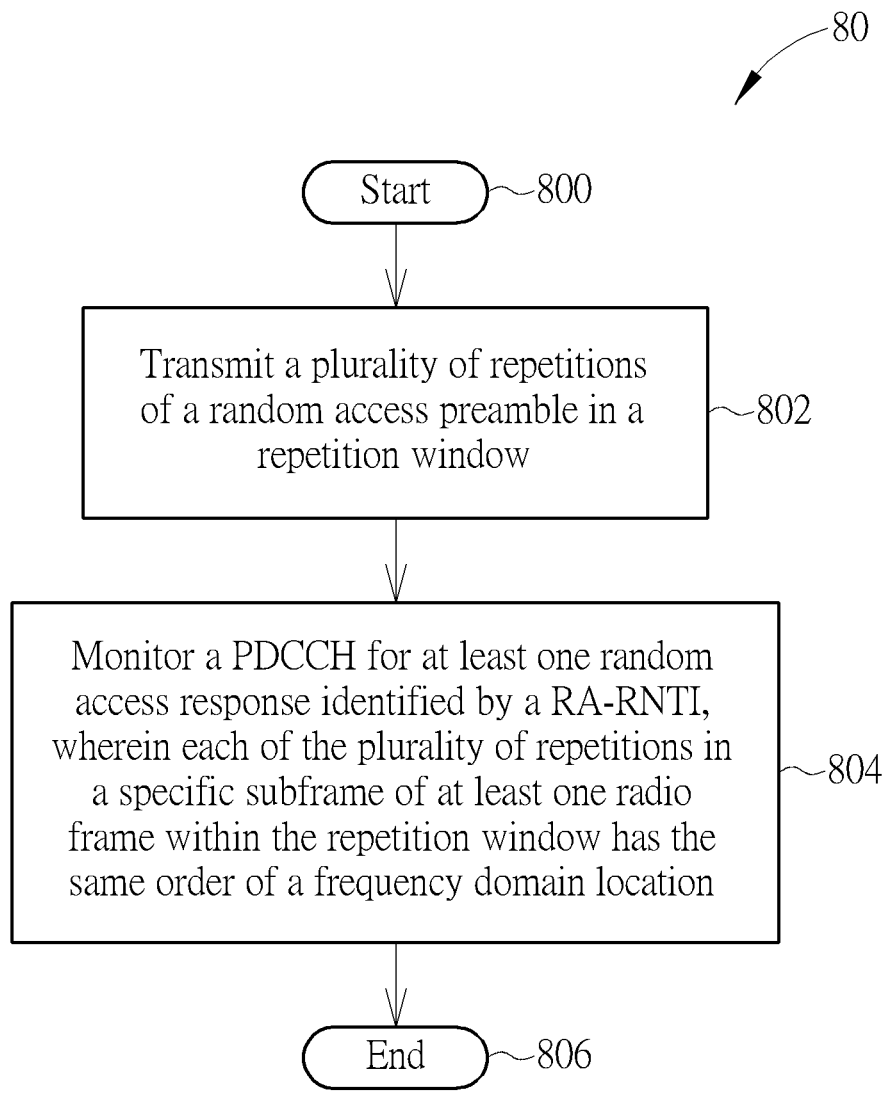

Please refer to FIG. 8, which is a flowchart of a process 80 according to an embodiment of the present invention. The process 80 may be utilized in a UE of the wireless communication system 10 shown in FIG. 1, for handling random access with coverage enhancement. The process 80 may be compiled into the program code 214 and includes the following steps:

Step 800: Start.

Step 802: Transmit a plurality of repetitions of a random access preamble in a repetition window.

Step 804: Monitor a PDCCH for at least one random access response identified by a RA-RNTI, wherein each of the plurality of repetitions in a specific subframe of at least one radio frame within the repetition window has the same order of a frequency domain location.

Step 806: End.

According to the process 80, the UE in an enhanced coverage mode first transmits a plurality of repetitions of a random access preamble in a repetition window, in order to initiate a random access procedure to get uplink synchronization with an eNB. The UE then monitors the PDCCH for random access response(s) identified by a RA-RNTI. Each of the plurality of repetitions in a specific subframe of at least one radio frame within the repetition window has the same order of a frequency domain location.

More specifically, as shown in FIG. 4, the repetition window includes radio frames N, N+1, N+2 and N+3. If the specific subframe is subframe 3, the repetitions of the random access preamble may have the same order of the frequency domain location in the subframe 3 of the radio frames N, N+1, N+2 and N+3. In other words, if the index f_id for the PRACH transmitting the repetitions of the random access preamble in the frequency domain is 0 within the subframe 3 of the radio frame N, the index f_id may also be determined to 0 within the subframe 3 of the radio frames N+1, N+2 and N+3.

Please note that the eNB may successfully decode the random access preamble after receiving any numbers of repetitions. For example, the eNB may successfully decode the random access preamble when receiving the first repetition, so that the eNB may configure the RA-RNTI based on the parameters obtained within the first radio frame of the repetition window (e.g., the subframe 3 and the order of frequency domain location in the subframe 3 within the radio frame N of the repetition window shown in FIG. 4). However, the eNB may not successfully decode the random access preamble after receiving all repetitions transmitted within the first radio frame of the repetition window. For example, the eNB may successfully decode the random access preamble by receiving the repetitions transmitted within the second radio frame of the repetition window without combining with any repetitions transmitted within the first radio frame. In such a condition, the eNB can only configure the RA-RNTI based on the parameters obtained within the second radio frame of the repetition window (e.g., the subframe 3 and the order of frequency domain location in the subframe 3 within the radio frame N+1 of the repetition window shown in FIG. 4). However, the UE may still expect to receive a random access response identified by the RA-RNTI based on the parameters obtained within the first radio frame of the repetition window. Therefore, the indices for computing the RA-RNTI obtained from the first radio frame and the second radio frame should be the same, in order to allow the UE to successfully decode the random access response and subsequent DCI scrambled by the RA-RNTI.

More specifically, the process 80 may be combined with the process 30 to deal with this issue. According to the process 30, the specific subframe may be configured in advance for the determination of the RA-RNTI (e.g., the subframe 3); hence, the index t_id should be the same in each radio frame within the repetition window. According to the process 80, each of the repetitions in the specific subframe (e.g., the subframe 3) of all of the at least one radio frame within the repetition window may have the same order of the frequency domain location. In other words, the index f_id determined based on the specific subframe in each of the radio frames within the repetition window should be the same. This allows the UE to successfully receive the random access response identified the RA-RNTI no matter how the eNB decodes the random access preamble (e.g., by receiving any repetitions transmitted in any radio frames of the repetition window).

In addition, the RA-RNTI of the process 80 may also be computed as:

$$RA\text{-}RNTI=1+t\_id+10\times f\_id+delta\_shift;$$

wherein the definitions of the parameters t_id, f_id and delta_shift can be obtained in the above paragraphs. Furthermore, the repetition window of the process 80 may also be within a radio frame or spread across a plurality of radio frames.

Figure 9:
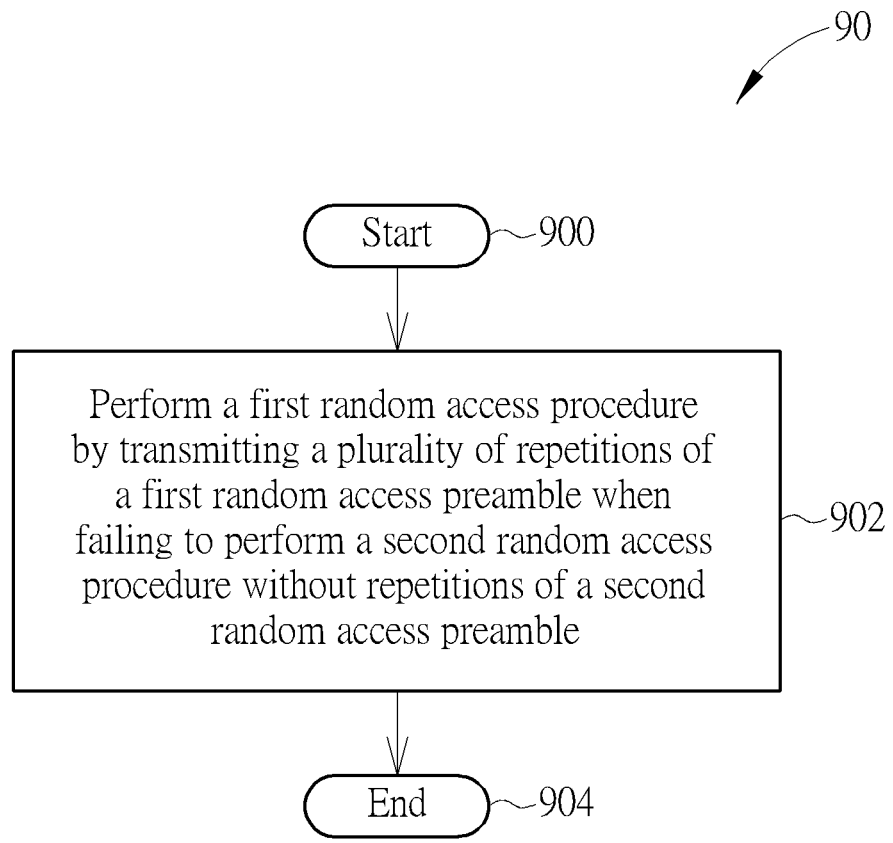

Please refer to FIG. 9, which is a flowchart of a process 90 according to an embodiment of the present invention. The process 90 may be utilized in a UE of the wireless communication system 10 shown in FIG. 1, for handling random access with coverage enhancement. The process 90 may be compiled into the program code 214 and includes the following steps:

Step 900: Start.

Step 902: Perform a first random access procedure by transmitting a plurality of repetitions of a first random access preamble when failing to perform a second random access procedure without repetitions of a second random access preamble.

Step 904: End.

According to the process 90, the UE may attempt to perform a random access procedure by transmitting a random access preamble without repetitions. If this attempt fails, the UE may determine that it is in an enhanced coverage mode, and then perform another random access procedure by transmitting a plurality of repetitions of another random access preamble.

Furthermore, the UE may still fail to perform the random access procedure by transmitting the plurality of repetitions of the random access preamble, which means that the random access procedure may fail even if coverage enhancement is applied. In such a condition, the UE may indicate a random access problem from the media access control (MAC) layer of the UE to the radio resource control (RRC) layer of the UE. In addition, the process 90 may also be combined with the embodiments realized according to the process 30, in order to make the random access procedure in the coverage enhanced mode feasible.

To sum up, the present invention provides a method of handling random access with coverage enhancement in a wireless communication system. The UE in the enhanced coverage mode may transmit a plurality of repetitions of a random access preamble in a repetition window when initiating a random access procedure to get uplink synchronization with an eNB. The RA-RNTI for identifying the corresponding random access response may be determined based on a specific subframe within the repetition window. Therefore, the random access procedure in the coverage enhanced mode will become feasible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access for a user equipment (UE) of a wireless communication system, the method comprising:
   transmitting a plurality of repetitions of a random access preamble in a repetition window; and
   monitoring a physical downlink control channel (PDCCH) for at least one random access response identified by a random access radio network temporary identifier (RA-RNTI);
   wherein the RA-RNTI is determined based on a specific subframe within the repetition window and the RA-RNTI is computed as:

$$\text{RA-RNTI}=1+t\_id+10\times f\_id+\text{delta\_shift};$$

wherein the t_id is an index of the specific subframe in a radio frame within the repetition window, the f_id is an index of a specific PRB pair for transmitting one of the plurality of repetitions of the random access preamble within a PRACH within the specific subframe in an ascending order of a frequency domain, and the delta_shift is a shift parameter to prevent overlap of the RA-RNTI with an RA-RNTI for another PRACH in which a legacy random access preamble without repetitions is transmitted.

2. The method of claim 1, wherein the index of the specific PRB pair is determined based on comparison with other PRB pairs of other PRACHs within the specific subframe in the ascending order of the frequency domain.

3. The method of claim 1, wherein the delta_shift is a maximum RA-RNTI used by another UE which transmits another random access preamble without repetitions.

4. The method of claim 1, wherein the delta_shift is 60 for a frequency division duplex system.

5. The method of claim 1, wherein the PRB pair within the PRACH within the specific subframe is a PRB pair with the lowest order in the frequency domain within the PRACH within the specific subframe.

6. The method of claim 1, wherein the repetition window is within a radio frame or spreads across a plurality of radio frames.

7. The method of claim 1, wherein the step of monitoring the PDCCH for the at least one random access response identified by the RA-RNTI is performed in a random access response window;
wherein the random access response window starts at the first subframe that contains an end of a repetition among the plurality of repetitions of the random access preamble within the repetition window plus three subframes, and has a length equal to the repetition window plus ra-ResponseWindow-Size subframes.

8. A method of handling random access for a network of a wireless communication system, the method comprising:
   receiving a plurality of repetitions of a random access preamble transmitted in a repetition window by a user equipment (UE) of the wireless communication system; and
   determining a random access radio network temporary identifier (RA-RNTI) based on a specific subframe within the repetition window; and
   transmitting at least one random access response identified by the RA-RNTI to allow the UE to monitor a physical downlink control channel (PDCCH) for the at least one random access response;
   wherein the RA-RNTI is determined based on a specific subframe within the repetition window and the RA-RNTI is computed as:

$$\text{RA-RNTI}=1+t\_id+10\times f\_id+\text{delta\_shift};$$

wherein the t_id is an index of the specific subframe in a radio frame within the repetition window, the f_id is an index of a specific PRB pair for transmitting one of the plurality of repetitions of the random access preamble within a PRACH within the specific subframe in an ascending order of a frequency domain, and the delta_shift is a shift parameter to prevent overlap of the RA-RNTI with an RA-RNTI for another PRACH in which a legacy random access preamble without repetitions is transmitted.

9. The method of claim 8, wherein the specific subframe is the first subframe of the repetition window, and the repetition window is within a radio frame or spreads across a plurality of radio frames.

10. The method of claim 8, further comprising:
    transmitting to the UE a configuration for the repetition window indicating a start position and a length of the repetition window via broadcast or a dedicated signaling.

11. The method of claim 8, wherein the delta_shift is 60 for a frequency division duplex system.

12. A user equipment (UE) handling random access in a wireless communication system, the UE comprising:
    a communication interfacing unit transmitting a plurality of repetitions of a random access preamble in a repetition window; and
    a processing means monitoring a physical downlink control channel (PDCCH) for at least one random access response identified by a random access radio network temporary identifier (RA-RNTI);
    wherein the RA-RNTI is determined based on a specific subframe within the repetition window and the RA-RNTI is computed as:

$$\text{RA-RNTI}=1+t\_id+10\times f\_id+\text{delta\_shift};$$

wherein the t_id is an index of the specific subframe in a radio frame within the repetition window, the f_id is an index of a specific PRB pair for transmitting one of the plurality of repetitions of the random access preamble within a PRACH within the specific subframe in an ascending order of a frequency domain, and the delta_shift is a shift parameter to prevent overlap of the RA-RNTI with an RA-RNTI for another PRACH in which a legacy random access preamble without repetitions is transmitted.

13. The UE of claim 12, wherein the index of the specific PRB pair is determined based on comparison with other PRB pairs of other PRACHs within the specific subframe in the ascending order of the frequency domain.

14. The UE of claim 12, wherein the delta_shift is a maximum RA-RNTI used by another UE which transmits another random access preamble without repetitions.

15. The UE of claim 12, wherein the delta_shift is 60 for a frequency division duplex system.

16. The UE of claim 12, wherein the PRB pair within the PRACH within the specific subframe is a PRB pair with the lowest order in the frequency domain within the PRACH within the specific subframe.

17. The UE of claim 12, wherein the repetition window is within a radio frame or spreads across a plurality of radio frames.

18. The UE of claim 12, wherein the processing means monitoring the PDCCH for the at least one random access response identified by the RA-RNTI is performed in a random access response window;
wherein the random access response window starts at the first subframe that contains an end of a repetition among the plurality of repetitions of the random access preamble within the repetition window plus three subframes, and has a length equal to the repetition window plus ra-ResponseWindow-Size subframes.

19. A network handling random access in a wireless communication system, the network comprising:
a receiving means receiving a plurality of repetitions of a random access preamble transmitted in a repetition window by a user equipment (UE) of the wireless communication system; and
a processing means determining a random access radio network temporary identifier (RA-RNTI) based on a specific subframe within the repetition window; and
a transmitting means transmitting at least one random access response identified by the RA-RNTI to allow the UE to monitor a physical downlink control channel (PDCCH) for the at least one random access response;
wherein the RA-RNTI is determined based on a specific subframe within the repetition window and the RA-RNTI is computed as:

$$\text{RA-RNTI} = 1 + t\_id + 10 \times f\_id + \text{delta\_shift};$$

wherein the t_id is an index of the specific subframe in a radio frame within the repetition window, the f_id is an index of a specific PRB pair for transmitting one of the plurality of repetitions of the random access preamble within a PRACH within the specific subframe in an ascending order of a frequency domain, and the delta_shift is a shift parameter to prevent overlap of the RA-RNTI with an RA-RNTI for another PRACH in which a legacy random access preamble without repetitions is transmitted.

20. The network of claim 19, wherein the specific subframe is the first subframe of the repetition window, and the repetition window is within a radio frame or spreads across a plurality of radio frames.

21. The network of claim 19, wherein the transmitting means transmits to the UE a configuration for the repetition window indicating a start position and a length of the repetition window via broadcast or a dedicated signaling.

22. The network of claim 19, wherein the delta_shift is 60 for a frequency division duplex system.

* * * * *